(12) United States Patent
Qi et al.

(10) Patent No.: US 7,830,916 B2
(45) Date of Patent: Nov. 9, 2010

(54) CYCLIC BANDWIDTH ALLOCATION METHOD WITH HARQ ENABLED

(75) Inventors: Xin Qi, Beijing (CN); Xiao Yi Wang, Beijing (CN)

(73) Assignee: Nokia Siemens Networks Oy, Espoo (FI)

( * ) Notice: Subject to any disclaimer, the term of this patent is extended or adjusted under 35 U.S.C. 154(b) by 122 days.

(21) Appl. No.: 12/283,447

(22) Filed: Sep. 12, 2008

(65) Prior Publication Data
US 2009/0103561 A1 Apr. 23, 2009

Related U.S. Application Data

(60) Provisional application No. 60/993,877, filed on Sep. 14, 2007.

(51) Int. Cl.
*H04J 3/16* (2006.01)
(52) U.S. Cl. ........................ 370/468; 370/329; 370/342; 370/344; 370/347; 455/452.2; 714/748; 714/799
(58) Field of Classification Search ................ 370/468, 370/329, 342–347; 455/450, 452.1, 452.2; 714/746, 748, 749, 751, 799
See application file for complete search history.

(56) References Cited

U.S. PATENT DOCUMENTS

2004/0109433 A1* 6/2004 Khan .......................... 370/345
2008/0175195 A1* 7/2008 Cho et al. .................... 370/329
2009/0225708 A1* 9/2009 Harada et al. ................ 370/329
2009/0274107 A1* 11/2009 Park et al. .................... 370/329

OTHER PUBLICATIONS

Samsung, "Discussion on control signaling for persistent scheduling of VoIP", 3GPP Draft; R2-063482, TSG-RAN2 Meeting #56, Riga, Latvia, Nov. 6-10, 2006, XP050132940, the whole document.
Samsung, "HARQ retransmissions for the DL persistent scheduling", 3GPP Draft; R2-073386, TSG-RAN2 Meeting #59, Athens Greece, Aug. 20-24, 2007, XP050136091, the whole document.
NTT DCoMo, Inc., "Issues regarding persistent scheduling", 3GPP Draft, R2-073567, TSG RAN WG2 #59, Athens, Greece, Aug. 20-24, 2007, XP050136258, the whole document.

(Continued)

*Primary Examiner*—Ricky Ngo
*Assistant Examiner*—Luat Phung
(74) *Attorney, Agent, or Firm*—Harrington & Smith

(57) ABSTRACT

A method is described which includes allocating transmission resources for transmitting data packets. The allocation of transmission resources includes a periodic allocation of the transmission resources that is applicable to a plurality of frames. The allocation of transmission resources includes an allocation of transmission resources for a first transmission of each HARQ process during the plurality of frames. The method includes receiving an indication of an allocation of transmission resources for data packets in a plurality of frames. Receiving and/or transmitting packets during the plurality of frames using the allocation of transmission resources is also included in the method. The frames in the plurality of frames may include a compressed MAC header. Apparatus and computer programs are also described.

33 Claims, 20 Drawing Sheets

OTHER PUBLICATIONS

Nokia, "Scheduling of LTE DL VoIP", 3GPP Draft, R2-070006, TSG-RAN WG2 Meeting #56, Jan. 14-19, 2007, Sorrento, Italy, XP050133126, the whole document.

Motorola, "Uplink Control Signaling with Persistent Scheduling", 3GPP Draft, R1-073758, TSG RAN1#50, Athens, Greece, Aug. 20-24, 2007, XP050107345, the whole document.

3GPP RAN1 R1-063275, "Discussion on control signaling for persistent scheduling of VoIP", Samsung(2006).

Draft IEEE 802.16m Requirements, Aug. 13, 2007 section 6.3.6.7.3 of IEEE 80216j-06_026r4, "IEEE 802.16j Baseline Document" (2007).

* cited by examiner

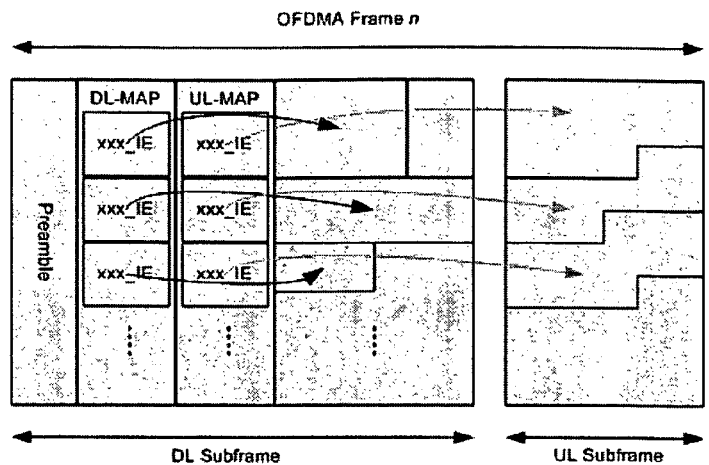
FIGURE 1 PRIOR ART
| Generic MAC Header (6 bytes) | MAC Packet Payload | |
|---|---|---|
| | Compressed IP/UDP/RTP Header (4 bytes) | VoIP AMR 12.2k Packet (31 bytes) |
FIGURE 2 PRIOR ART
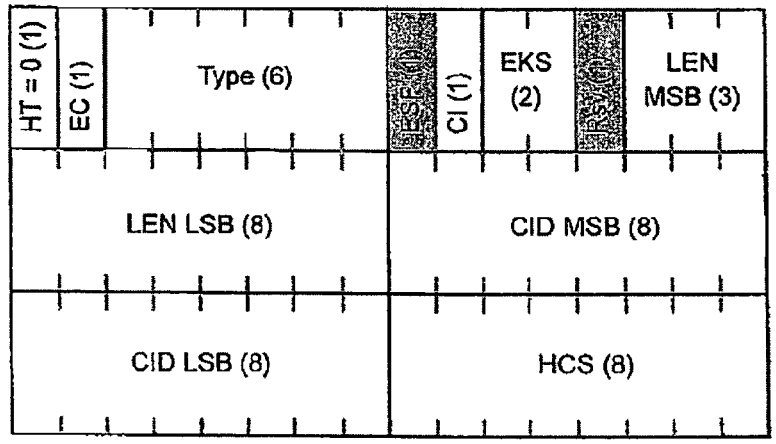
FIGURE 4A
FIGURE 4B

| Compressed MAC Header (2 bytes) | MAC Packet Payload ||
|---|---|---|
| | Compressed IP/UDP/RTP Header (4 bytes) | VoIP AMR 12.2k Packet (31 bytes) |

FIG.5

TABLE 1: Compressed MAC header fields

| NAME | SIZE | DESCRIPTION |
|---|---|---|
| EC | 1 bit | Encryption Control, 0=Payload is not encrypted, 1=Payload is encrypted |
| EKS | 2 bits | Encryption Key Sequence |
| Length | 6 bits | The length in bytes of the MAC PDU including the compressed MAC header |
| Type | 1 bit | Downlink: FAST-FEEDBACK Allocation subheader<br>Uplink: Grant Management subheader<br>1=present, 0=absent |
| CRC | 5 bits | Header Check Sequence:<br>The generator polynomial is $g = D^5 + D^4 + D^2 + 1$ |

FIG.9

TABLE 2: DL_Cyclic_Allocation_IE

| SYNTAX | SIZE | NOTES |
|---|---|---|
| DL_Cyclic_Allocation_IE{ | | |
| Extended-2 DIUC | 4 bits | NN |
| Length | 8 bits | Variable |
| N_Cyclic_new | 6 bits | The number of cyclically allocated bursts that will be activated or changed from this frame |
| For (i=0; i<N_Cyclic_new; i++){ | | Allocation table of cyclically allocated PHY bursts that will be activated or changed from this frame |
| OFDMA symbol offset | 8 bits | |
| Subchannel offset | 6 bits | |
| No. OFDMA Symbols | 5 bits | |
| No. Subchannels | 6 bits | |
| DIUC | 4 bits | |
| N_CID | 4 bits | The number of connections in this cyclically allocated PHY burst |
| For (i=0; i<N_CID; i++){ | | |
| CID | 16 bits | |
| } | | |
| Boosting | 3 bits | |
| Cycle | 4 bits | Repeating cycle, in frames |

FIG.10a

| | | |
|---|---|---|
| Repetition Coding Indication | 2 bits | |
| Header Pattern | 2 bits | Identify which kind of MAC header is used in the burst<br>00: generic MAC header<br>01: new MAC header type I<br>10: new MAC header type II<br>11: RSV |
| ~ | | |
| No_Cyclic_Del | 6 bits | The number of connections that will be terminated using cyclic bandwidth allocation from this frame |
| For (i=0; i<N_Cyclic_Del; i++) { | | |
| CID | 16 bits | |
| ~ | | |
| padding | | |
| ~ | | |

FIG.10b

| FIG.10a |
|---|
| FIG.10b |

FIG.10

TABLE 3: UL_Cyclic_Allocation_IE

| SYNTAX | SIZE | NOTES |
|---|---|---|
| UL_Cyclic_Allocation_IE{ | | |
| Extended-2 UIUC | 4 bits | N/N |
| Length | 8 bits | Variable |
| N_Cyclic_new | 6 bits | The number of cyclically allocated bursts that will be activated or changed from this frame |
| For (i=0; i<N_Cyclic_new; i++){ | | Allocation table of cyclically allocated PHY bursts that will be activated or changed from this frame |
| OFDMA symbol offset | 8 bits | |
| Subchannel offset | 6 bits | |
| No. OFDMA Symbols | 5 bits | |
| No. Subchannels | 5 bits | |
| UIUC | 4 bits | |
| N_CID | 4 bits | The number of connections in this cyclically allocated PHY burst |
| For (i=0; i<N_CID; i++){ | | |
| CID | 16 bits | |
| } | | |
| Cycle | 4 bits | Repeating cycle, in frames |
| Repetition Coding Indication | 2 bits | |

FIG.11a

| | | |
|---|---|---|
| Header Pattern | 2 bits | Identify which kind of MAC header is used in the burst<br>00: generic MAC header<br>01: new MAC header type I<br>10: new MAC header type II<br>11: RSV |
| ~ | | |
| No_Cyclic_Del | 6 bits | The number of connections that will be terminated using cyclic bandwidth allocation from this frame |
| For (i=0; i<N_Cyclic_Del; i++) { | | |
| CID | 16 bits | |
| ~ | | |
| padding | | |
| ~ | | |

FIG.11b

| FIG.11a |
|---|
| FIG.11b |

FIG.11

TABLE 4: HARQ_DL_Cyclic_Allocation_IE

| SYNTAX | SIZE | NOTES |
|---|---|---|
| HARQ_DL_Cyclic_Allocation_IE{ | | |
| Extended-2 DIUC | 4 bits | NN |
| Length | 8 bits | Variable |
| N_Cyclic_new | 6 bits | The number of cyclically allocated bursts that will be activated or changed from this frame |
| For (i=0; i<N_Cyclic_new; i++){ | | Allocation table of cyclically allocated PHY bursts that will be activated or changed from this frame |
| OFDMA symbol offset | 8 bits | |
| Subchannel offset | 6 bits | |
| No. OFDMA Symbols | 5 bits | |
| No. Subchannels | 5 bits | |
| DIUC | 4 bits | |
| CID | 16 bits | |
| Boosting | 3 bits | |
| Cycle | 4 bits | Repeating cycle, in frames |
| Repetition Coding Indication | 2 bits | |
| Header Pattern | 2 bits | Identify which kind of MAC header is used in the burst 00: generic MAC header |

FIG.12a

| | | |
|---|---|---|
| HARQ Enable | 1 bit | 01: new MAC header type I<br>10: new MAC header type II<br>11: RSV |
| if (HARQ Enable==1){ | | |
| AL_SN | 1 bit | The value of AL_SN for all the first transmissions of the bursts in the cyclic bandwidth allocation |
| SPID | 3 bits | The value of SPID for all the first transmissions of the bursts in the cyclic bandwidth allocation |
| ACID | 4 bits | HARQ Channel ID in the current frame (i.e. the parameter "c" defined in the invention) |
| N_channel | 4 bits | Overall number of used HARQ channels (i.e. the parameter "M" defined in the invention) |
| if (HARQ mode=0){ | | |
| NEP code | 4 bits | Code of encoder packet bits |
| NSCH code | 4 bits | Code of allocated subchannels |
| } else if (HARQ mode=1){ | | |
| Shortened DIUC | 3 bits | Shortened DIUC |
| Companded SC | 5 bits | Code of allocated subchannels |
| ~ | | |
| Absolute_Loc_Flag | 1 bit | |

FIG.12b

| | | |
|---|---|---|
| if (Absolute_Loc_Flag=1){ | | |
| Absolute_ACK location | 7 bits | Absolute UL ACK channel location in the ACKCH region, counting from the end of the region. E.g. assume the ACKCH region could contain *n* ACK channels. If this "Absolute_ACK location" is set to be *k*, then the offset of this specific channel in in the ACKCH region is *n-k-1* |
| } | | |
| } | | |
| Semi_Ab_Loc_Flag | 1 bit | |
| if (Semi_Ab_Loc_Flag=1){ | | |
| Semi_Ab_ACK_Loc | 7 bits | Semi absolute ACK channel location. The ACK channel allocation of all the connection without using. "Absolute_Loc_Flag" is allocated by this field. The location are determined by the order of the CID (without using "Absolute_Loc_Flag") in the loop. Each allocation will add by 1, counting from the end of the ACKCH region. Semi_Ab_ ACK_Loc is the location of the 1st eligible connection, counting from the end of the ACKCH region. |
| } | | |

FIG.12c

| | | |
|---|---|---|
| N_Cyclic_Del | 6 bits | The number of connections that will be terminated using cyclic bandwidth allocation from this frame |
| For (i=0; i<N_Cyclic_Del; i++) { | | |
| CID | 16 bits | |
| } | | |
| padding | | |

FIG.12d

| |
|---|
| FIG.12a |
| FIG.12b |
| FIG.12c |
| FIG.12d |

FIG.12

TABLE 5: HARQ_UL_Cyclic_Allocation_IE

| SYNTAX | SIZE | NOTES |
|---|---|---|
| HARQ_UL_Cyclic_Allocation_IE{ | | |
| Extended-2 UIUC | 4 bits | NN |
| Length | 8 bits | Variable |
| N_Cyclic_new | 6 bits | The number of cyclically allocated bursts that will be activated or changed from this frame |
| For (i=0; i<N_Cyclic_new; i++){ | | Allocation table of cyclically allocated PHY bursts that will be activated or changed from this frame |
| OFDMA symbol offset | 8 bits | |
| Subchannel offset | 6 bits | |
| No. OFDMA Symbols | 5 bits | |
| No. Subchannels | 5 bits | |
| UIUC | 4 bits | |
| CID | 16 bits | |
| Cycle | 4 bits | Repeating cycle, in frames |
| Repetition Coding Indication | 2 bits | |
| Header Pattern | 2 bits | Identify which kind of MAC header is used in the burst<br>00: generic MAC header |

FIG.13a

| | | |
|---|---|---|
| HARQ_Enable | 1 bit | 01: new MAC header type I<br>10: new MAC header type II<br>11: RSV |
| if (HARQ_Enable==1){ | | |
| AI_SN | 1 bit | The value of AI_SN for all the first transmissions of the bursts in the cyclic bandwidth allocation |
| SPID | 3 bits | The value of SPID for all the first transmissions of the bursts in the cyclic bandwidth allocation |
| ACID | 4 bits | HARQ Channel ID in the current frame (i.e. the parameter "c" defined in the invention) |
| N_channel | 4 bits | Overall number of used HARQ channels (i.e. the parameter "M" defined in the invention) |
| if (HARQ mode=0){ | | |
| NEP code | 4 bits | Code of encoder packet bits |
| NSCH code | 4 bits | Code of allocated subchannels |
| } else if (HARQ mode=1){ | | |
| Shortened DIUC | 3 bits | Shortened DIUC |
| Companded SC | 5 bits | Code of allocated subchannels |
| } | | |
| Absolute_Loc_Flag | 1 bit | |

FIG.13b

| | | |
|---|---|---|
| if (Absolute_Loc_Flag=1){ | | |
| Absolute_ACK location | 7 bits | DL_ACK bit location in the ACK bitmap, counting from the end of the ACK bitmap. E.g. assume the ACK bitmap is $n$ bit long. If this "Absolute_ACK location" is set to be $k$, then the offset of this specific ACK bit in the ACK bitmap is $n-k-1$ |
| } | | |
| } | | |
| Semi_Ab_Loc_Flag | 1 bit | |
| if (Semi_Ab_Loc_Flag=1){ | | |
| Semi_Ab_ACK_Loc | 7 bits | Semi absolute ACK bit location. The ACK bit location of all the connection without using "Absolute_Loc_Flag" is allocated by this field. The location are determined by the order of the CID (without using "Absolute_Loc_Flag") in the loop. Each allocation will add by 1, counting from the end of the ACK bitmap. Semi_Ab_ACK_Loc is the location of the 1st eligible ACK bit, counting from the end of the ACK bitmap. |
| } | | |

FIG.13c

| N_Cyclic_Del | 6 bits | The number of connections that will be terminated using cyclic bandwidth allocation from this frame |
|---|---|---|
| For (i=0; i<N_Cyclic_Del; i++) { | | |
| CID | 16 bits | |
| } | | |
| padding | | |

FIG.13d

| FIG.13a |
|---|
| FIG.13b |
| FIG.13c |
| FIG.13d |

FIG.13

CYCLIC BANDWIDTH ALLOCATION METHOD WITH HARQ ENABLED

CROSS REFERENCE

This patent application claims priority to Provisional U.S. application Ser. No.: 60/993,877, filed Sep. 14, 2007, the disclosures of which is incorporated by reference in its entirety.

TECHNICAL FIELD

The exemplary and non-limiting embodiments of this invention relate generally to wireless communication systems, methods, devices and computer program products and, more specifically, relate to techniques related to bandwidth allocation and automatic repeat request operations.

BACKGROUND

Various abbreviations that appear in the specification and/or in the drawing figures are defined as follows:
ACID HARQ channel identifier
ACK acknowledgment
BS base station
CID connection identifier
CRC cyclic redundancy check
DL downlink (e.g., BS towards MS)
HARQ hybrid automatic repeat request
IE information element
LTE long term evolution
MAC medium access control
MCS modulation coding scheme
MS mobile station
N_ACID number of asynchronous channels
OFDM orthogonal frequency division multiplex
OFDMA orthogonal frequency division multiple access
PDU protocol data unit
PHY physical
QAM quadrature amplitude modulation
QPSK quadrature phase shift keying
UL uplink (e.g., MS towards BS)
VoIP voice over internet protocol This section is intended to provide a background or context to this invention. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Recently the IEEE 802.16 working group has established a new task group, 802.16m, to provide an advanced air interface which amends IEEE 802.16-2004 (see IEEE 802.16-2004, "IEEE Standard for Local and Metropolitan Area Networks—Part 16: Air Interface for Fixed Broadband Wireless Access Systems," Jun. 24, 2004) and 802.16e (see IEEE 802.16e-2005, "IEEE Standard for Local and Metropolitan Area Networks—Part 16: Air Interface for Fixed and Mobile Broadband Wireless Access Systems," Feb. 28, 2006) in order to meet the requirements of next generation mobile networks. One target of the 802.16m specification work is to improve the VoIP capacity of the system (see in general Draft IEEE 802.16m Requirements, 2007-10-19).

The VoIP support in the current IEEE 802.16 specification is not efficient due at least to the bandwidth consumption by the DL-MAP and UL-MAP messages, and the generic MAC header found in every frame that transmits the VoIP packets.

After a VoIP session is activated, VoIP packets typically arrive at the MAC layer from an upper layer periodically both for the downlink and the uplink. The VoIP packet size can remain the same for some tens of frames and then change to another state. As a result, the bandwidth (PHY resources) in a number of future frames that is needed for the transmission of VoIP packets is nearly predetermined. However, in the current IEEE 802.16 standard definition the bandwidth allocation information (MAP-IE) is broadcast to the SS, also referred to herein as a MS, in every frame using DL-MAP, UL-MAP messages, as shown in FIG. 1. That is, the bandwidth is allocated to the MS in a per-frame manner.

While this type of bandwidth allocation method is dynamic, the signaling overhead can be too great when running a VoIP application. For example, the DL-MAP-IE and the UL-MAP-IE are 7.5 bytes and 4 bytes, respectively. Note as well that the use of a repetition code is typically needed for the transmission of the DL-MAP and the UL-MAP. Therefore, the bandwidth consumption of this signaling overhead in DL-MAP and UL-MAP can be excessive.

In addition to the MAP messages, for both the downlink and the uplink, the 6-byte generic MAC header presents additional signaling overhead. FIG. 2 shows the MAC PDU structure of an exemplary VoIP codec, the widely used AMR 12.2k. A MAC-layer ARQ is not needed for VoIP, so the CRC is not needed in the MAC PDU. The voice source encoder outputs a 31-byte packet every 20 ms. The IP/UDP/RTP header is normally compressed to 4 bytes. Thus, the payload of this MAC packet is 35 bytes.

Assuming a case that a repetition coding of 4 is used for the MAP messages, and the MCS of PHY burst for VoIP is QPSK/rate-0.5 coding (the same with MAP messages), and taking the uplink as an example, the signaling overhead of an uplink VoIP packet is UL-MAP-IE+generic MAC header=4(bytes)*8(bits)/1(bit/s/Hz)*4(repetition code)+6(bytes)*8(bits)/1(bit/s/Hz)=176(data subcarriers), which is too large for the payload:

35(bytes)*8(bits)/1(bit/s/Hz)=280(data subcarriers).

Note that when the MCS of the PHY burst containing the VoIP packet is more efficient than the MCS for the MAP messages, which is typically the case, the signaling overhead is even larger as compared to the payload.

Of interest to the ensuing description of the exemplary embodiments of this invention is the persistent scheduling approach in 3GPP-LTE (e.g., see 3GPP RAN1 R1-063275, "Discussion on control signaling for persistent scheduling of VoIP", Samsung), as well as the scheduling method presented in section 6.3.6.7.3 of IEEE 80216j-06_026r4, "IEEE 802.16j Baseline Document".

SUMMARY

The following summary provides exemplary and non-limiting example in accordance with this invention.

An exemplary embodiment in accordance with this invention is a method for cyclical allocation (also referred to as a periodic allocation). The method includes allocating transmission resources for transmitting data packets. The allocation of transmission resources includes an allocation of transmission resources for a first transmission of each HARQ process during a plurality of frames. Transmitting an indication of the allocation of transmission resources is also included in the method.

Another exemplary embodiment in accordance with this invention is a method for periodic allocation. The method includes receiving an indication of an allocation of transmission resources for data packets in a plurality of frames. Receiving and/or transmitting a plurality of data packets using the allocation of transmission resources are also included in the method. The allocation of transmission resources includes an allocation of transmission resources for a first transmission of each HARQ process during the plurality of frames.

A further exemplary embodiment in accordance with this invention is a computer program for periodic allocation. A computer readable memory may tangibly embody the computer program of instructions including allocating transmission resources for transmitting data packets. Transmitting an indication of the allocation of transmission resources is also included in the instructions. Allocating transmission resources includes allocating transmission resources for a first transmission of each HARQ process during a plurality of frames.

Another exemplary embodiment in accordance with this invention is a computer program for periodic allocation. A computer readable memory may tangibly embody the computer program of instructions including receiving an indication of an allocation of transmission resources for data packets. Receiving and/or transmitting a plurality of data packets using the allocation of transmission resources are also included in the instructions. The allocation of transmission resources includes an allocation of transmission resources for a first transmission of each HARQ process during a plurality of frames.

A further exemplary embodiment in accordance with this invention is an apparatus for periodic allocation. The apparatus includes a processing unit configured to allocate transmission resources for transmitting data packets. A transmitter configured to transmit an indication of the allocation of transmission resources is also included in the apparatus. Allocating transmission resources includes allocating transmission resources for a first transmission of each HARQ process during a plurality of frames.

Another exemplary embodiment in accordance with this invention is an apparatus for periodic allocation. The apparatus includes a transceiver configured to receive an indication of an allocation of transmission resources for data packets in a plurality of frames; and to one of receive and transmit the plurality of frames using the allocation of transmission resources. The allocation of transmission resources includes an allocation of transmission resources for a first transmission of each HARQ process during the plurality of frames.

A further exemplary embodiment in accordance with this invention is an apparatus for periodic allocation. The apparatus includes means for allocating transmission resources for transmitting data packets. Means for transmitting an indication of the allocation of transmission resources are also included. Allocating transmission resources includes allocating transmission resources for a first transmission of each HARQ process during a plurality of frames.

Another exemplary embodiment in accordance with this invention is an apparatus for periodic allocation. The apparatus includes means for receiving an indication of an allocation of transmission resources for data packets in a plurality of frames. Transceiver means for receiving and/or transmitting a plurality of data packets during the frames using the allocation of transmission resources. The allocation of transmission resources includes an allocation of transmission resources for a first transmission of each HARQ process during the plurality of frames.

BRIEF DESCRIPTION OF THE DRAWINGS

In the attached Drawing Figures:

FIG. 1 shows the bandwidth allocation mechanism of current 802.16 standard.

FIG. 2 shows the 802.16 VoIP MAC packet structure with generic MAC header.

FIG. 4A shows a conventional generic MAC header as specified 1EEE Std. 802.16e.

FIG. 4B depicts a MAC header type I, Compressed MAC header for Cyclic Scheduling, in accordance with an exemplary embodiment of this invention.

FIG. 5 shows an 802.16 VoIP MAC packet structure with compressed MAC header in accordance with an exemplary embodiment of this invention.

FIGS. 9-13 each illustrate a Table, where

FIG. 9 shows a Table 1: Compressed MAC header fields;

FIG. 10 shows a Table 2: DL_Cyclic_Allocation_IE;

FIG. 11 shows a Table 3: UL_Cyclic_Allocation_IE;

FIG. 12 shows a Table 4: HARQ_DL_Cyclic_Allocation_IE; and

FIG. 13 shows a Table 5: HARQ_UL_Cyclic_Allocation_IE.

DETAILED DESCRIPTION

Described herein is a novel bandwidth allocation mechanism for use in IEEE 802.16 (although not necessarily limited to only this particular standard) that meets IEEE 802.16m requirement for VoIP capacity. This approach may be referred to for convenience, but not as a limitation, as a HARQ-enabled cyclic bandwidth allocation method. Several important aspects of this approach include, but are not limited to, the following:

A) the mechanism and signaling of the cyclic bandwidth allocation method;

B) a new MAC header that is capable of further decreasing the MAC overhead when the cyclic bandwidth allocation method is used, or that is capable of enhancing the amount of signaling information that can be conveyed by the MAC header; and C) HARQ support for the novel cyclic bandwidth allocation method (including HARQ channel allocation, ACK feedback channel allocation and the overall signaling method).

These and other aspects of exemplary embodiments in accordance with this invention are discussed in detail below. However, reference is first made to FIG. 14 for illustrating a simplified block diagram of various electronic devices that are suitable for use in practicing an exemplary embodiment of this invention.

Figure 14:
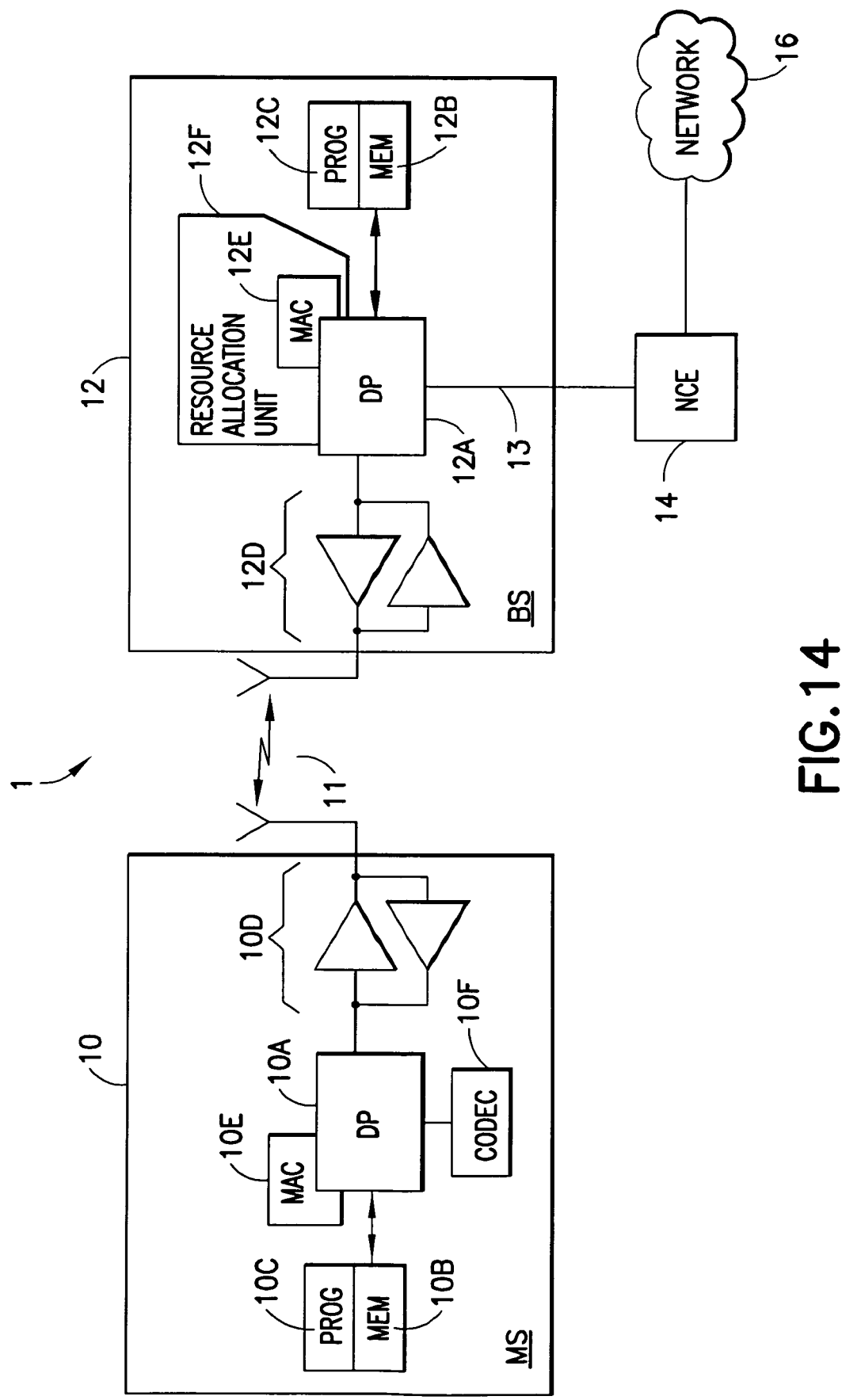
FIG. 14 is a simplified block diagram of various electronic devices that are suitable for use in practicing an exemplary embodiment of this invention.

In FIG. 14 a wireless system 1 is adapted for communication with at least one MS 10 via a BS 12, although in a typical implementation there will a plurality of MSs 10 that are served by the BS 12. The system 1 may include a network control element (NCE) 14 and, in general, may be compatible with IEEE 802-16 or similar protocols. An external network 16, such as the Internet, may be coupled to the system 1 via the NCE 14 or directly through the BS 12, depending on the specifics of the system implementation.

The MS 10 includes a data processor (DP) 10A, a memory (MEM) 10B that stores a program (PROG) 10C, and a suitable radio frequency (RF) transceiver 10D for bidirectional wireless communications with the BS 12 via a wireless link 11. Note that in some implementations there may be one or more relay elements or nodes (not shown) through which the wireless link 11 passes.

The BS 12 also includes a DP 12A, a MEM 12B that stores a PROG 12C, and a suitable RF transceiver 12D. The BS 12 may be coupled via a data path 13 to the NCE 14. The PROGs 10C and 12C are assumed to include program instructions that, when executed by the associated DP, enable the electronic device to operate in accordance with an exemplary embodiment of this invention, as will be discussed below in greater detail.

In general, the exemplary embodiments of this invention may be implemented at least in part by computer software executable by the DP 10A of the MS 10 and by the DP 12A of the BS 12, or by hardware, or by a combination of software and hardware.

In general, the various embodiments of the MS 10 can include, but are not limited to, radio telephones (such as cellular phones), personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

For the purposes of describing an exemplary embodiment of this invention it may be assumed that both the MS 10 and the BS 12 include a MAC layer or function 10E, 12E, respectively, and that the MS 10 includes a data source such as, but not limited to, a codec 10F, such as an AMR codec suitable for use in conducting a VoIP communication connection. The functionality associated with the PHY layer is assumed to be handled at least in part by the transceivers 10D, 12D, and associated Layer 1 circuitry and components. A resource allocation unit or function 12F at the BS 12, which may be assumed to include at least a portion of the MAC function 12E, operates as described below to provide the cyclic bandwidth allocation, as well as the related HARQ and ACK information, needed by the MS 10 for operating a session connection, such as when transmitting data output from the codec 10F.

An exemplary embodiment of this invention is now described in detail.

A) Cyclic Bandwidth Allocation Method

Figure 3:
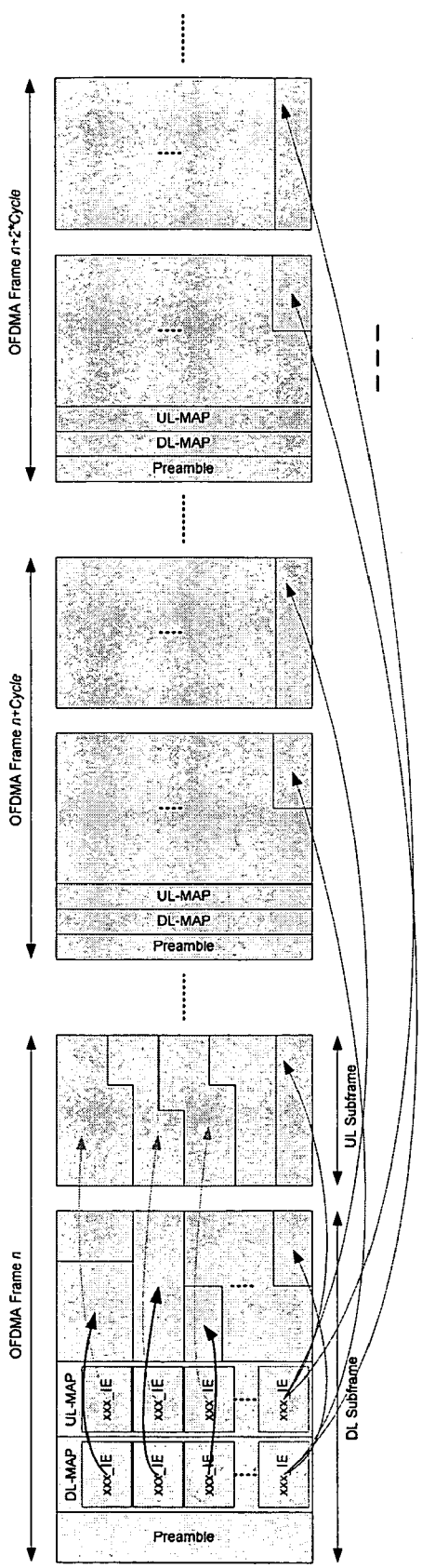
FIG. 3 illustrates a proposed cyclic bandwidth allocation method for 802.16 standard.
Figure 7:
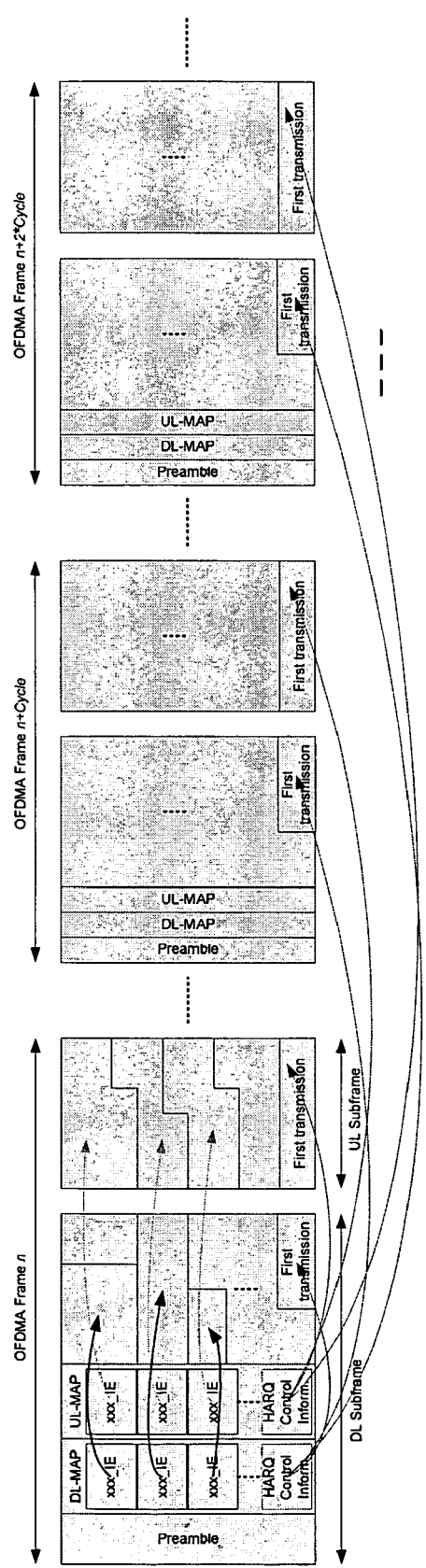
FIG. 7 illustrates a HARQ enabled cyclic bandwidth allocation method in accordance with an exemplary embodiment of this invention.

The cyclic bandwidth allocation method may be applied to both the downlink and the uplink. Referring to FIG. 3, in this method the bandwidth allocation for VoIP packets is not performed in each frame. If a PHY burst is allocated in an OFDM frame n using this method, then before de-allocation or change, the same PHY burst is allocated in the same slots in frame: n+k*cycle, automatically and without incurring signaling overhead in MAP messages associated with the burst, where k=1, 2, 3 . . . and "cycle" is a parameter that may be varied or tuned according to the periodicity of VoIP packets. The "pre-allocated" PHY bursts contain future VoIP packets of the same connection. In this manner, the signaling overhead in DL-MAP/UL-MAP messages exists only in the frame where the VoIP data flow begins, or terminates, or the state of the VoIP connection changes (e.g., silent suppression begins), or for a case where the MCS of the PHY burst is to be reconfigured due to, for example, a change of state in the wireless channel. The related MS 10 refers to the MAP message of a current frame to start/change/terminate the receiving/transmission of VoIP packets in current and future frames.

Consider now a simple example using the method discussed above, and assume the following (non-limiting) conditions:

1. the OFDM frame length is 5 ms;
2. the packets of a downlink VoIP session are generated by the VoIP source coder every 20 ms; and
3. the VoIP session is activated at frame n.

In this case the value of "cycle" is given by 20/5=4. In frame n, using this method, the BS 12 allocates a certain set of PHY slots that is appropriate for one VoIP packet. Then, in future frames n+4k, k=1, 2 . . . , the MS 10 cyclically decodes the same PHY slots until the BS 12 notifies the MS 10 of a change of PHY burst for the VoIP session. Before the PHY burst change, the BS 12 does not send DL-MAP information associated with this VoIP session to the MS 10, thereby conserving signaling bandwidth.

Note that this procedure is not limited for use with only VoIP connections, and could be used as well for, as a non-limiting example, any other services with a similar periodic characteristic, such as E1 and T1.

B. New MAC Header to Further Decrease the MAC Overhead

When the PHY burst is allocated to one unique connection and the cyclic allocation method is used as described above, a further exemplary aspect of this invention may be used to compress the MAC header of MAC packets. One motivation to compress the MAC header is based on a realization that the CID and certain other fields in the generic MAC header are not required for this particular scenario. The selection of the MAC header pattern may be done by the BS 12 dynamically.

One non-limiting embodiment of the compressed MAC header is given below. Basically, the generic MAC header shown in FIG. 4A (see also IEEE 802.16e-2005, "IEEE Standard for Local and Metropolitan Area Networks—Part 16: Air Interface for Fixed and Mobile Broadband Wireless Access Systems," Feb. 28, 2006, in particular Section 6.3.2.1.1 "Generic MAC header") is converted to the compressed MAC header, as shown in FIG. 4B (New MAC header type I, Compressed MAC header for Cyclic Scheduling) by removing unnecessary fields. Unnecessary header or subheader type information may also be omitted by removing the HT bit and as many as five of the six Type bits. The meanings of various fields in the compressed MAC header are described in Table 1, shown in FIG. 9, which provides an exemplary set of fields for the compressed MAC header.

As a result, one obtains the VoIP MAC packet structure in FIG. 5, the use of which eliminates four bytes per VoIP packet as compared the use of the generic MAC header without the compression made possible by the use of these exemplary embodiments of the invention.

Figure 6:
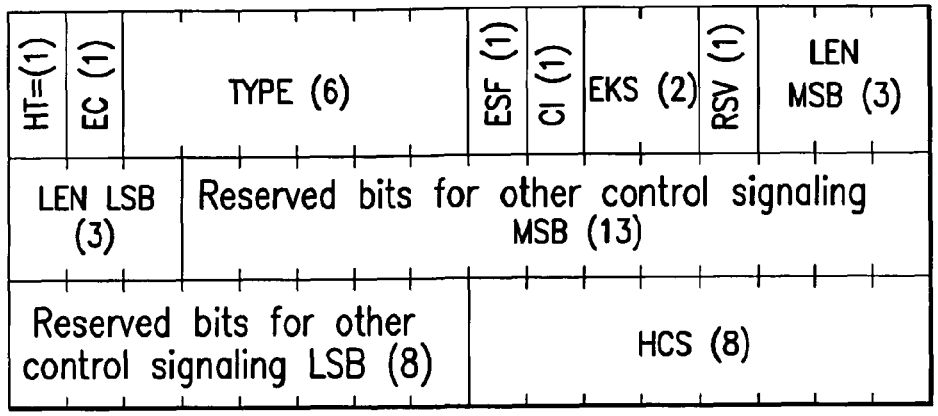
FIG. 6 shows a MAC header type II in accordance with an exemplary embodiment of this invention.

An alternative approach, also within the scope of the exemplary embodiments of this invention, is to not change the length of generic MAC header shown in FIG. 4A, but to instead retain the CID and other unnecessary fields in the generic MAC header for other control signaling purposes. FIG. 6 presents one non-limiting example of this approach (referred to herein and in certain of the Tables in FIGS. 1-13 as the "MAC header type II"). Those fields not indicated as "reserved bits . . . " have the same meaning and convey the same information as the current 802.16 generic MAC header shown in FIG. 4A. As an additional enhancement, the field "length" may be modified to be 6 bits since, and assuming a VoIP connection as an example, a VoIP packet is normally short and would not require all of the eleven bits reserved for expressing the packet length in the conventional generic MAC header (FIG. 4A).

It can be noted that the reserved bits may be used for any desired purpose, such as for bandwidth request purposes, channel feedback information in the UL and/or sleep mode control information in the DL, as non-limiting examples. In general, the reserved bits could be used to accommodate future WiMAX signaling design.

C. HARQ-Enabled Cyclic Bandwidth Allocation

HARQ support is beneficial for VoIP sessions in terms of spectrum efficiency, error protection against channel fading and latency. However, the cyclic bandwidth allocation method described above may not operate properly if HARQ is enabled. This is true at least for the reason that in the current 802.16 HARQ mechanism, the HARQ control information (e.g., HARQ modes, channel, and subpacket identifier) for PHY bursts should be broadcast by the BS 12 in the same frame as the bursts. In the cyclic bandwidth allocation method, the signaling overhead in DL-MAP/UL-MAP messages exists only in the frame where the VoIP data flow begins, or terminates, or the state of VoIP changes (e.g., silent suppression begins), or where the MCS of PHY burst changes.

Another issue is that the ACK channel allocation in an UL and a DL ACK bitmap would be unclear to the MS 10 and the BS 12. In the current 802.16 standard, in the DL a DL_HARQ_ACK_IE is used by the BS 12 to send a HARQ acknowledgment to the UL HARQ-enabled traffic, and the ACK bit position in the bitmap is determined by the order of the HARQ enabled UL bursts in the UL-MAP. Similarly, in the UL the HARQ ACK Region Allocation IE is used by the BS 12 to define an UL region to include ACK channels for the MS 10 to send a HARQ acknowledgment to DL HARQ-enabled traffic being received from the BS 12. The ACK channel offset for a specific DL burst in the region is determined by the order of the HARQ-enabled DL burst indicated by the DL MAP.

As can be appreciated, when the above-described cyclic bandwidth allocation method is in use the bandwidth allocations are not broadcast by the BS 12 every frame to allocate the PHY burst. Instead, the bandwidth allocation is broadcast only once after the start/change of the burst. In other words, when the cyclic allocation method is in use it may happen that there are some HARQ-enabled bursts in a frame without associated MAP-IEs in that frame. Thus, using the current 802.16 ACK channel allocation (or ACK bitmap) method, the MS 10 or BS 12 cannot have knowledge of the correct ACK allocation for the cyclically allocated PHY bursts.

Further in accordance with an exemplary embodiment of this invention this problem is overcome, when cyclic bandwidth allocation method is used, by the use of a novel HARQ mechanism. In this technique the HARQ control mechanism for the first transmissions of the cyclically allocated bursts is performed in a semi-static manner, the HARQ channel selection is performed in a cyclic manner, and the ACK feedback channel allocation is performed in an explicit manner, as described in further detail below.

First, for HARQ-enabled traffic using cyclic bandwidth allocation, for each PHY packet the HARQ control information for the first transmission is transmitted in a similar way as the bandwidth allocation information for the cyclic bandwidth allocation. More specifically, it is transmitted in the frame where the first bandwidth allocation of the VoIP begins. The control information in a frame n thus controls the first transmission (and its ACK allocation) of the HARQ processes of the cyclically allocated PHY bursts in frame n, and in future frames n+k*cycle preceding a change of cyclic allocation. Reference in this regard can be made to FIG. 7.

Second, it is noted that the HARQ of the current IEEE 802.16 is a stop-and-wait protocol supporting multi-channel operation. The parameters for the configuration of every HARQ-enabled burst mainly determine the HARQ mode, channel, and subpacket identifier. Except for the HARQ channel identifier, in accordance with an aspect of this invention all the other parameters have the same values for the cyclically allocated PHY bursts. In this way these parameters can be transmitted only once when the related cyclic bandwidth allocation begins.

Third, and further in accordance with an exemplary embodiment of this invention the HARQ channel selection obeys the following rule.

In frame n where the cyclical bandwidth allocation and HARQ control information are transmitted, the BS 12 sets the initial HARQ channel for the PHY burst as channel c (e.g, also referred to as an ACID), where c has a valid value as a HARQ channel number, and where c<M, where M is the total number of used HARQ channels. Then, in frame n+k*cycle, without explicit signaling the PHY burst automatically uses channel (k mod M)+c, k=1, 2, 3 . . . . Additionally, the channel range may include an offset, S, the PHY burst may automatically use channel ((k+c) mod R)+S, k=1, 2, 3 . . . , where R and S are integer numbers and R+S<M.

For an alternative rule: the HARQ channel for the first transmission after enabling the cyclic scheduling is configured by the BS and indicated to the MS via explicit signaling. The initial HARQ channel value as c (e.g., an ACID). The HARQ channel is incremented by 1 for each periodic transmission and reset to c when a maximum number of HARQ channels (e.g., M, or an N_ACID) is reached. The maximum number of HARQ channels may be configured by the BS and indicated to the MS via explicit signaling.

Note that there are at most 16 HARQ channels for each connection, as currently defined by the IEEE 802.16 standard. Therefore, and assuming this maximum number of HARQ channels, the value of M is equal or less than 16. Correspondingly the first M HARQ channels are allocated cyclically to the HARQ-enabled bursts in a predetermined fashion, and there is no need to send control information for HARQ channel selections after the start of the cyclically allocated bursts.

The remaining 16-M HARQ channels may be used for the other bursts of the same connection is needed.

Due to the nature of the features of the cyclic allocation method and the characteristics of a VoIP connection, the retransmission in a particular channel will always be finished before the HARQ channel is used in the next round. Even if for some reason it is not finished the BS 12 may flexibly schedule other HARQ channels for the cyclically allocated burst in the current frame, without terminating the entire HARQ-enabled cyclic allocation. For example, the HARQ channel $c_1$ is used for burst $b_1$ in a cyclic bandwidth allocation in frame $N_1$. In frame $N_1$+M*cycle, normally the HARQ process of $b_1$ has been finished, then $c_1$ is used for the new burst $b_2$. However, if the HARQ process of $b_1$ has not finished, the BS 12 may allocate another HARQ channel, for example M+1, to the new burst (using the normal HARQ-MAP-IE), and the cyclic HARQ channel allocation for the future bursts after burst $b_2$ is not changed by this operation.

The HARQ control of the retransmissions (after the first transmission) of cyclically allocated HARQ enabled bursts may use the mechanism as currently specified in IEEE 802.16. Note that the HARQ channel is predetermined by the cyclic HARQ control information, and the retransmissions of a burst use the predetermined HARQ channel.

The MSs 10 are preferably explicitly informed of the offsets of the ACK channel in the UL ACK region or the ACK Bit in the DL ACK Bitmap, for the first transmission of HARQ process of the cyclically allocated HARQ-enabled PHY bursts. The offsets according to the end of the ACK region are preferably fixed (i.e., not changed every frame according to the order of HARQ-enabled DL bursts in the DL/UL-MAP), and set by the BS 12 and broadcast to MSs 10 together with the HARQ control information at the beginning of the cyclic bandwidth allocation. It is preferred that all of the ACK feedback channels for HARQ-enabled cyclically allocated bursts are allocated to the end of the ACK region.

Figure 8:
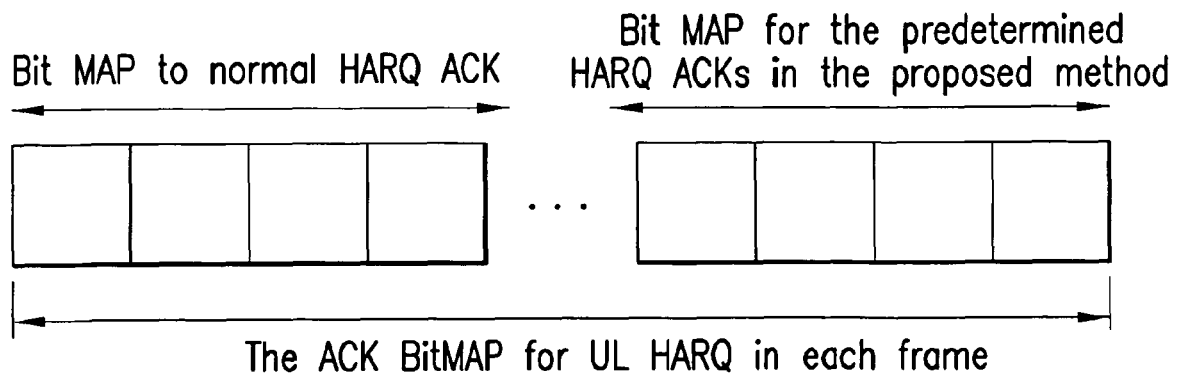
FIG. 8 illustrates an example of ACK allocation for UL HARQ in accordance with an exemplary embodiment of this invention.

Reference can be made to FIG. 8 for showing an example of the ACK bitmap of the UL HARQ. The first part of the ACK region is allocated for normal HARQ ACK feedbacks, and the second part of the ACK region is allocated for the first HARQ transmission of cyclically allocated bursts. The size of the entire ACK region may be set dynamically in every frame by the BS 12, ensuring that there are sufficient ACK channels for both modes of bandwidth allocation. In this way backwards compatibility can be readily provided.

It is noted that the references herein to information being broadcast to the MS 10 implies a point-to-multipoint transmission in accordance with the signaling technique used for IEEE 802.16, even for resource allocation to a single MS or SS. However, it should be realized that in other non-limiting embodiments of this invention the information may be sent in a point-to-point transmission.

In support of the foregoing exemplary embodiments new DL-MAP and UL-MAP extended-2 IEs are defined to support the cyclic bandwidth allocation method in the downlink and the uplink, respectively. The IEs list the cyclic PHY bursts that are to be allocated/changed/deallocated in the current frame.

First, there is defined an OFDMA DL-MAP extended-2 IE for the downlink as shown in Table 2: DL_Cyclic_Allocation_IE (see FIG. 10).

Second, there is defined an OFDMA UL-MAP extended-2 IE for the uplink as shown in Table 3: UL_Cyclic_Allocation_IE (see FIG. 11).

Provided now is a non-limiting example that illustrates the advantages made possible by the use of an exemplary embodiment of this invention. Consider an uplink VoIP AMR 12.2k connection. Assume that the burst profile for MAP messages is QPSK/rate-0.5 coding with repetition code 4, and the burst profile for this VoIP connection is 16QAM/rate-0.5 coding. With the current IEEE 802.16 bandwidth allocation method, based on the computation discussed above, in every frame where there is a VoIP packet there will be a signaling overhead of 152 data subcarriers (UL-MAP-IE+generic MAC header=4*8/1*4+6*8/2=152) and the payload is 140 data subcarriers (35*8/2=140). Thus, the per-frame overhead is 108.6% of the payload.

This can be contrasted with the procedures made possible by the use of this invention as follows. First assume that the VoIP codec 10E output changes every 10 packets (worst case). Then for all the 10 packets, when the generic MAC header is used, the signaling overhead is 464 data subcarriers (UL_Cyclic_Allocation_IE+10*generic MAC header=7*8/1*4+10*6*8/2=464). Thus, the per-frame overhead is 464/10/140=33.1% of the payload. Obviously, the efficiency is greatly improved, i.e., about 75% for this specific case. If the compressed MAC header is used, the signaling overhead is 304 data subcarriers (UL_Cyclic_Allocation_IE+10*compressed MAC header=7*8/1*4+10*2*8/2=304). In this case the per-frame overhead is 304/10/140=21.7% of the payload, which is an even greater improvement.

The following Cyclic_HARQ_DL/UL_MAP extended-2 IEs may be defined to support the HARQ-enabled cyclic bandwidth allocation, which are based on the HARQ MAP messages and HARQ_MAP_IEs in the current IEEE 802.16, and on the Cyclic_Allocation_IEs as described herein. Reference in this regard can be made to Table 4: HARQ_DL_Cyclic_Allocation_IE (see FIG. 12) and to Table 5: HARQ_UL_Cyclic_Allocation_IE (see FIG. 13). Note that these Tables provide an implementation for supporting single antenna incremental redundancy HARQ. The extension to other HARQ cases is straightforward.

In summary, the advantages that are gained by the use of these exemplary embodiments include, but are not limited to, the following.

First, the transmission efficiency for VoIP and similar types of data traffic is significantly improved due at least in part to the elimination of unnecessary per-frame signaling overhead in DL-MAP/UL-MAP messages.

Second, the improved MAC header can be employed to decrease the MAC overhead further in certain scenarios, or to contain other useful control signaling.

Further, HARQ support is provided for the cyclic bandwidth allocation to even further improve spectrum efficiency.

In addition, the use of these exemplary embodiments is backwards compatible with an existing population of MSs 10, since if a given MS 10 does not support the enhanced allocation method then it may continue to operate in accordance with existing protocols.

Based on the foregoing it should be apparent that the exemplary embodiments of this invention provide method, apparatus and computer program products to facilitate wireless communication between a mobile station and a base station.

An exemplary embodiment in accordance with this invention is a method. The method, described in FIG. 15, includes (at Block 15A) allocating with one allocation operation uplink or downlink resources to a MS for transmitting data packets, the allocated resources comprising a cyclic bandwidth allocation of a certain slot in a plurality of frames; (Block 15B) when allocating the resources for transmitting the data also allocating downlink or uplink resources to the MS for automatic repeat request (ARQ, more specifically HARQ) during the plurality of frames; and (Block 15C) when allocating the resources for automatic repeat request use, also explicitly allocating an acknowledge bit for the BS to transmit ACK/NACK to the MS, or an acknowledge feedback channel for the MS to transmit ACK/NACK to the BS during the plurality of frames. Note that the UL and DL traffic are not necessarily allocated together. If HARQ is enabled and allocating the resources for hybrid automatic repeat request use, the method includes (at Block 15D) allocating HARQ channel IDs for the following transmissions.

In another exemplary embodiment of the method of the preceding paragraph, allocating uses one of a compressed MAC header having a smaller size than a generic MAC header, that is optimized for use with the cyclic bandwidth allocation, or a MAC header having a same size as the generic MAC header wherein certain predefined fields may be used for conveying other signaling information.

In a further exemplary embodiment of the method of the preceding paragraphs, an identification of an automatic repeat request logic channel, an acknowledge channel, and automatic repeat request coding and modulation information are signaled by the BS but once to the MS at the beginning a multi-frame session connection.

In another exemplary embodiment of the method of the preceding paragraphs, the data packets transmitted during the session connection comprise VoIP data packets.

In a further exemplary embodiment of the method of the preceding paragraphs, allocating with one allocation operation the uplink or downlink resources to the MS for transmitting PHY burst comprises allocating a resource in an OFDM frame n, where before de-allocation or a change in the allocation the same resource is allocated in frame: n+k*cycle, automatically and without incurring signaling overhead in MAP messages associated with the burst, where k=1, 2, 3 . . . and "cycle" is a parameter that may be varied according to the periodicity of the transmitted data packets.

In another exemplary embodiment of the method of the preceding paragraphs, control information in a frame n controls the first transmission, and its acknowledge allocation, of HARQ processes of cyclically allocated PHY bursts in frame n, and in future frames n+k*cycle, until termination or a change of cyclic allocation.

In a further exemplary embodiment of the method of the preceding paragraphs, HARQ channel selection is made in accordance with a rule: in frame n where the cyclical bandwidth allocation and HARQ control information are transmitted, the BS sets the HARQ channel for the PHY burst as channel c, where c has a valid value as a HARQ channel number, and where c<M, where M is a total number of used HARQ channels, so that in frame n+k*cycle, without explicit signaling, the PHY burst automatically uses channel (k mod M)+c, k=1, 2, 3 . . . .

In another exemplary embodiment of the method of the preceding paragraphs, the acknowledge (ACK) feedback channel is explicitly provided to the MS by indicating offsets of the ACK channel in an UL ACK region or an ACK Bit in a DL ACK Bitmap, for the first transmission of the cyclically allocated HARQ-enabled PHY bursts.

In a further exemplary embodiment of the method of the preceding paragraphs, the offsets, according to an end of the ACK region, are not changed from frame-to-frame according to an order of HARQ-enabled bursts in a DL/UL-MAP, where all ACK feedback channels for HARQ-enabled cyclically allocated PHY bursts are allocated to the end of the ACK region, and where a beginning part of the ACK region is allocated for other HARQ ACK feedback use.

Figure 15:
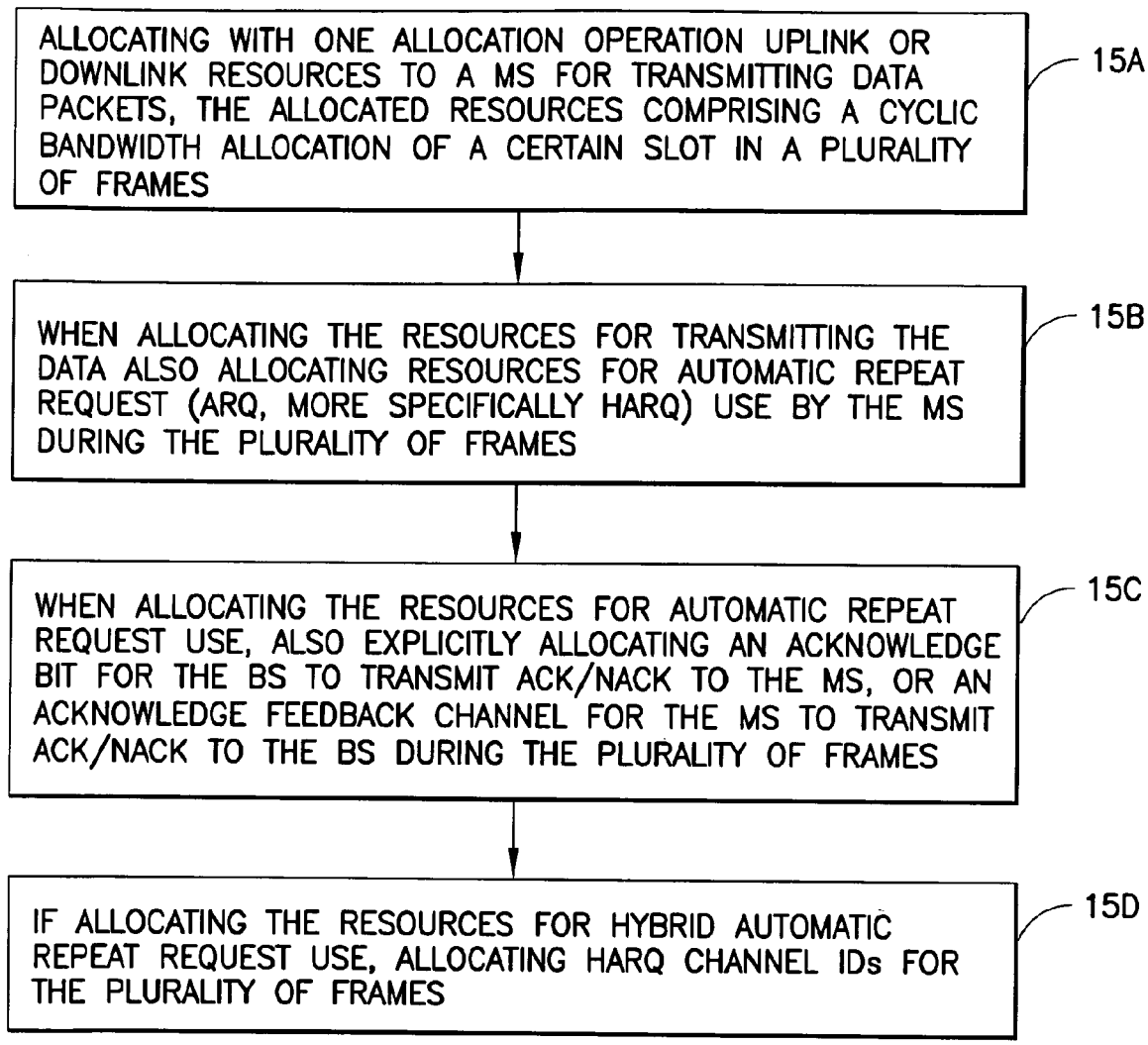
FIG. 15 illustrates the operation of a method, and the result of execution of computer program instructions, in accordance with embodiments of this invention.

The exemplary embodiments of this invention also pertain to apparatus disposed at the BS 12 that operates in accordance with the method shown in FIG. 15. Further in this regard, the BS 12 includes a resource allocation unit, which may be embodied at least partially in the MAC function 12E, that is configurable to allocate in a single allocation operation uplink or downlink resources to the MS 10 for transmitting data packets. The allocation operation uses a cyclic bandwidth allocation in a plurality of frames, and further includes also allocating resources for HARQ use by the MS 10 during the plurality of frames. The allocation operation even further includes, when allocating the resources for the HARQ, also explicitly allocating an acknowledge bit for the BS 12 to transmit ACK/NACK to the MS 10, or an acknowledge feedback channel for the MS 10 to transmit ACK/NACK to the BS 12 during the plurality of frames. The data packets transmitted may comprise VoIP data packets.

When allocating the uplink or downlink resources the resource allocation unit may use one of a compressed MAC header having a smaller size than a generic MAC header, that is optimized for use with the cyclic bandwidth allocation, or a MAC header having a same size as the generic MAC header wherein certain predefined fields are used for conveying other signaling information.

An identification of a HARQ logic channel, an ACK channel, and HARQ-related coding and modulation information may be signaled by the BS 12 but once to the MS 10 at the beginning a multi-frame session connection.

In the BS 12 of the preceding paragraphs, where the resource allocation unit is configurable to allocate resource for a PHY burst in an OFDM frame n, where before de-allocation or a change in the allocation the same PHY burst is allocated the same resource in frame: n+k*cycle, automatically and without incurring signaling overhead in MAP messages associated with the burst, where k=1, 2, 3 . . . and "cycle" is a parameter that may be varied according to periodicity of the transmitted data packets.

In the BS 12 of the preceding paragraphs, where control information in a frame n controls the first transmission, and the ACK allocation, of HARQ processes of cyclically allocated PHY bursts in frame n, and in future frames n+k*cycle, until termination or a change of cyclic allocation.

In the BS 12 of the preceding paragraphs, where HARQ channel selection is made in accordance with a rule: in frame n where the cyclical bandwidth allocation and HARQ control information are transmitted, and the resource allocation unit of the BS 12 sets the HARQ channel for the PHY burst as channel c, where c has a valid value as a HARQ channel number, and where c<M, where M is a total number of used HARQ channels, so that in frame n+k*cycle, without explicit signaling, the PHY burst automatically uses channel (k mod M)+c, k=1, 2, 3 . . . .

In the BS 12 of the preceding paragraphs, where the ACK feedback channel is explicitly provided to the MS 10 by indicating offsets of the ACK channel in an UL ACK region or an ACK Bit in a DL ACK Bitmap, for the first transmission of the cyclically allocated HARQ-enabled PHY bursts.

In the BS 12 of the preceding paragraph, where the offsets, according to an end of the ACK region, are not changed from frame-to-frame according to an order of HARQ-enabled bursts in a DL/UL-MAP, where all ACK feedback channels for HARQ-enabled cyclically allocated PHY bursts are allocated to the end of the ACK region, and where a beginning part of the ACK region is allocated for other HARQ ACK feedback use.

In the BS 12 of the preceding paragraphs, where the apparatus is embodied at least partially in one or more integrated circuit components and packages.

The exemplary embodiments of this invention also pertain to apparatus embodied in, and methods executed by, the MS 10 that is configurable to respond to the cyclic bandwidth allocation, the allocation of HARQ-related resources, and the allocation of ACK-related resources, for transmitting data packets, such as VoIP data packets, to the BS 12 in accordance therewith.

The various blocks shown in FIG. 15 may be viewed as method steps, and/or as operations that result from operation of computer program code, and/or as a plurality of coupled logic circuit elements constructed to carry out the associated function(s).

Figure 16:
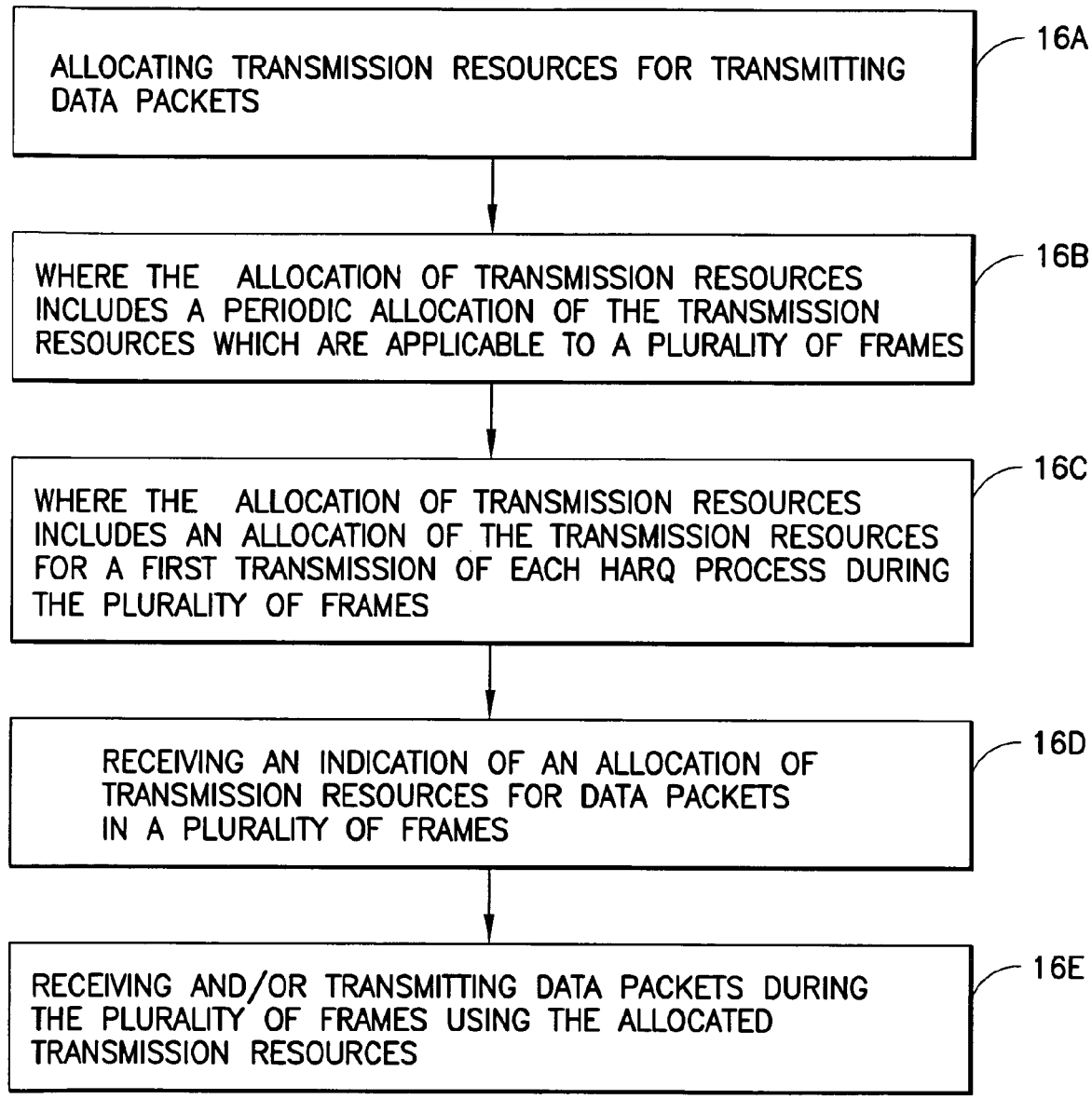
FIG. 16 illustrates the operation of a method, and the result of execution of computer program instructions, in accordance with embodiments of this invention.

The method, described in FIG. 16, includes (at Block 16A) allocating transmission resources for transmitting data packets. The allocation of transmission resources includes a periodic allocation of the transmission resources which are applicable to a plurality of frames (at Block 16B). (At Block 16C) The allocation of transmission resources includes an allocation of transmission resources for a first transmission of each HARQ process during the plurality of frames. The method includes (at Block 16D) receiving an indication of an allocation of transmission resources for data packets in a plurality of frames. Receiving and/or transmitting data packets during the plurality of frames using the allocation of transmission resources is also included in the method (at Block 16E). As a non-limiting example, the plurality of frames may be consecutive frames.

An exemplary embodiment in accordance with this invention is a method for cyclical bandwidth allocation. The method includes allocating transmission resources for transmitting data packets. The allocation of transmission resources includes a cyclic bandwidth allocation of the transmission resources in a plurality of frames. The allocation of transmission resources includes an allocation of transmission resources for a first transmission of each HARQ process during the plurality of frames. Transmitting an indication of the allocation of transmission resources is also included in the method.

In a further exemplary embodiment of the method above, a MAC header includes the indication.

In another exemplary embodiment of any one of the methods above, the indication includes one or more of an identification of an HARQ channel, an ACK channel and HARQ coding and modulation information.

In a further exemplary embodiment of any one of the methods above, transmitting the indication occurs at a first frame of the plurality of frames.

In another exemplary embodiment of any one of the methods above, allocating transmission resources for transmitting data packets includes allocating resource for a PHY layer burst in an OFDM frame. The same PHY layer burst may automatically be allocated the same resource in subsequent frames until transmitting an indication of de-allocating or a changing the allocation of the transmission resources.

In a further exemplary embodiment of any one of the methods above, the HARQ channel for a frame n+k×cycle is defined as channel (k mod M)+c; where c has a valid value as a HARQ channel number, and c<M, M is a total number of used HARQ channels, cycle is a periodicity parameter of the data packets (or an allocation period for the data packets), k is an integer number, and frame n is a first frame in the plurality of frames.

In another exemplary embodiment of the method above, the cyclic bandwidth allocation includes an allocation of: for a first frame in the plurality of frames, a HARQ channel 0. For subsequent frames in the plurality of frames, where the HARQ channel of an immediately previous frame in the plurality of frames is channel n: when n+1 is less than a maximum number of allocated asynchronous channel identifier (ACID), M, a HARQ channel (n+1) and when n+1 is equal to M, the HARQ channel 0. The feedback may be a NACK.

In a further exemplary embodiment of any one of the methods above, at least one frame in the plurality of frames includes a compressed MAC header.

In another exemplary embodiment of any one of the methods above, when the transmission resources are UL resources, allocating transmission resources for the HARQ process includes allocating one or more ACK bits for a transmission of feedback during the plurality of frames and when the transmission resources are DL resources, allocating transmission resources for the HARQ process includes allocating an ACK feedback channel.

In a further exemplary embodiment of any one of the methods above, the feedback is one or more of an ACK and a NACK.

In another exemplary embodiment of any one of the methods above, the transmission resources are one or more of UL resources and DL resources.

In a further exemplary embodiment of any one of the methods above, the data packets are VoIP data packets or another kind of real-time packets.

Another exemplary embodiment in accordance with this invention is a method for cyclical bandwidth allocation. The method includes receiving an indication of an allocation of transmission resources for data packets in a plurality of frames. Receiving and/or transmitting the plurality of frames using the allocation of transmission resources are also included in the method. The allocation of transmission resources includes a cyclic bandwidth allocation of the transmission resources in the plurality of frames. The allocation of transmission resources includes an allocation of transmission resources for a first transmission of each HARQ process during the plurality of frames.

In a further exemplary embodiment of the method above, a MAC header includes the indication.

In another exemplary embodiment of any one of the methods above, the indication includes one or more of an identification of an HARQ channel, an ACK channel and HARQ coding and modulation information.

In a further exemplary embodiment of any one of the methods above, when receiving the plurality of frames, receiving the indication occurs at a first frame of the plurality of frames.

In another exemplary embodiment of any one of the methods above, the allocation of transmission resources includes an allocation for a PHY layer burst in an OFDM frame. A subsequent PHY layer burst may be received in the same resource in subsequent frames until receiving an indication of a de-allocation or a changing of the allocation of the transmission resources.

In a further exemplary embodiment of any one of the methods above, the HARQ channel for a frame n+k×cycle is defined as channel (k mod M)+c, where c has a valid value as a HARQ channel number, and c<M, M is a total number of used HARQ channels, cycle is an allocation period of the data packets, k is an integer number, and frame n is a first frame in the plurality of frames.

In another exemplary embodiment of the method above, the cyclic bandwidth allocation includes an allocation of: for a first frame in the plurality of frames, a HARQ channel 0, and for subsequent frames in the plurality of frames, where the HARQ channel of an immediately previous frame in the plurality of frames is channel n: when n+1 is less than a maximum number of allocated ACID, M, the HARQ channel (n+1) and when n+1 is equal to M, the HARQ channel 0. The HARQ may be a NACK HARQ. In a further exemplary embodiment of any one of the methods above, at least one frame in the plurality of frames includes a compressed MAC header.

In a further exemplary embodiment of any one of the methods above, when the transmission resources are UL resources, the allocation of transmission resources for the HARQ process includes an allocation of one or more ACK bits for a transmission of feedback during the plurality of frames and when the transmission resources are DL resources, the allocation of transmission resources for the HARQ process includes an allocation of an ACK feedback channel. The feedback may be one or more of an ACK and a NACK.

In another exemplary embodiment of any one of the methods above, the transmission resources are one or more of UL resources and DL resources.

In a further exemplary embodiment of any one of the methods above, the data packets include VoIP data packets or another kind of real-time packets.

Another exemplary embodiment in accordance with this invention is a computer program for cyclical bandwidth allocation. A computer readable memory may tangibly embody the computer program of instructions including allocating transmission resources for transmitting data packets, where the allocation of transmission resources include a cyclic bandwidth allocation of the transmission resources in a plurality of frames. Transmitting an indication of the allocation of transmission resources is also included in the instructions. Allocating transmission resources includes allocating transmission resources for a first transmission of each HARQ process during the plurality of frames.

In a further exemplary embodiment of the computer program above, the indication includes one or more of an identification of an HARQ channel, an ACK channel and HARQ coding and modulation information.

In another exemplary embodiment of any one of the computer programs above, transmitting the indication occurs at a first frame of the plurality of frames.

In a further exemplary embodiment of any one of the computer programs above, allocating transmission resources for transmitting data packets includes allocating a PHY layer burst in an OFDM frame.

In another exemplary embodiment of any one of the computer programs above, the HARQ channel for a frame n+k×cycle is defined as channel (k mod M)+c, where c has a valid value as a HARQ channel number, and c<M, M is a total number of used HARQ channels, cycle is an allocation period of the data packets, k is an integer number, and frame n is a first frame in the plurality of frames.

In a further exemplary embodiment of the computer program above, the cyclic bandwidth allocation includes an allocation of: for a first frame in the plurality of frames, a HARQ channel 0, and for subsequent frames in the plurality of frames, where the HARQ channel of an immediately previous frame in the plurality of frames is channel n: when n+1 is less than a maximum number of allocated ACID, M, the HARQ channel (n+1) and when n+1 is equal to M, the HARQ channel 0.

In another exemplary embodiment of any one of the computer programs above, at least one frame in the plurality of frames includes a compressed MAC header.

A further exemplary embodiment in accordance with this invention is a computer program for cyclical bandwidth allocation. A computer readable memory may tangibly embody the computer program of instructions including receiving an indication of an allocation of transmission resources for data packets in a plurality of frames. Receiving and/or transmitting the plurality of frames using the allocation of transmission resources are also included in the instructions The allocation of transmission resources include a cyclic bandwidth allocation of the transmission resources in the plurality of frames. The allocation of transmission resources includes an allocation of transmission resources for a first transmission of each HARQ process during the plurality of frames.

In another exemplary embodiment of the computer program above, the indication includes one or more of an identification of an HARQ channel, an ACK channel and HARQ coding and modulation information.

In a further exemplary embodiment of any one of the computer programs above, when receiving the plurality of frames, receiving the indication occurs at a first frame of the plurality of frames.

In another exemplary embodiment of any one of the computer programs above, the HARQ channel for a frame n+k× cycle is defined as channel (k mod M)+c, where c has a valid value as a HARQ channel number, and c<M, M is a total number of used HARQ channels, cycle is an allocation period of the data packets, k is an integer number, and frame n is a first frame in the plurality of frames.

In a further exemplary embodiment of the computer program above, the cyclic bandwidth allocation includes an allocation of: for a first frame in the plurality of frames, a HARQ channel 0, and for subsequent frames in the plurality of frames, where the HARQ channel of an immediately previous frame in the plurality of frames is channel n: when n+1 is less than a maximum number of allocated ACID, M, the HARQ channel (n+1) and when n+1 is equal to M, the HARQ channel 0.

In another exemplary embodiment of any one of the computer programs above, at least one frame in the plurality of frames includes a compressed MAC header.

A further exemplary embodiment in accordance with this invention is an apparatus for cyclical bandwidth allocation. The apparatus includes a processing unit configured to allocate transmission resources for transmitting data packets, where the allocation of transmission resources include a cyclic bandwidth allocation of the transmission resources in a plurality of frames. A transmitter configured to transmit an indication of the allocation of transmission resources is also included in the apparatus. Allocating transmission resources includes allocating transmission resources for a first transmission of each HARQ process during the plurality of frames.

In another exemplary embodiment of the apparatus above, the indication includes one or more of an identification of an HARQ channel, an ACK channel and HARQ coding and modulation information.

In a further exemplary embodiment of any one of the apparatus above, transmitting the indication occurs at a first frame of the plurality of frames.

In another exemplary embodiment of any one of the apparatus above, allocating transmission resources for transmitting data packets includes allocating a PHY layer burst in an OFDM frame.

In a further exemplary embodiment of any one of the apparatus above, the HARQ channel for a frame n+k×cycle is defined as channel (k mod M)+c, where c has a valid value as a HARQ channel number, and c<M, M is a total number of used HARQ channels, cycle is an allocation period of the data packets, k is an integer number, and frame n is a first frame in the plurality of frames.

In another exemplary embodiment of the apparatus above, the cyclic bandwidth allocation includes an allocation of: for a first frame in the plurality of frames, a HARQ channel 0, and for subsequent frames in the plurality of frames, where the HARQ channel of an immediately previous frame in the plurality of frames is channel n: when n+1 is less than a maximum number of allocated ACID, M, the HARQ channel (n+1) and when n+1 is equal to M, the HARQ channel 0.

In a further exemplary embodiment of any one of the apparatus above, at least one frame in the plurality of frames includes a compressed MAC header.

Another exemplary embodiment in accordance with this invention is an apparatus for cyclical bandwidth allocation. The apparatus includes a transceiver configured to receive an indication of an allocation of transmission resources for data packets in a plurality of frames; and to one of receive and transmit the plurality of frames using the allocation of transmission resources. The allocation of transmission resources include a cyclic bandwidth allocation of the transmission resources in the plurality of frames, and the allocation of transmission resources includes an allocation of transmission resources for a first transmission of each HARQ process during the plurality of frames.

In a further exemplary embodiment of the apparatus above, the indication includes one or more of an identification of an HARQ channel, an ACK channel and HARQ coding and modulation information.

In another exemplary embodiment of any one of the apparatus above, when receiving the plurality of frames, receiving the indication occurs at a first frame of the plurality of frames.

In a further exemplary embodiment of any one of the apparatus above, the HARQ channel for a frame n+k×cycle is defined as channel (k mod M)+c, where c has a valid value as a HARQ channel number, and c<M, M is a total number of used HARQ channels, cycle is an allocation period of the data packets, k is an integer number, and frame n is a first frame in the plurality of frames.

In another exemplary embodiment of the apparatus above, the cyclic bandwidth allocation includes an allocation of: for a first frame in the plurality of frames, a HARQ channel 0, and for subsequent frames in the plurality of frames, where the HARQ channel of an immediately previous frame in the plurality of frames is channel n: when n+1 is less than a maximum number of allocated ACID, M, the HARQ channel (n+1) and when n+1 is equal to M, the HARQ channel 0.

In a further exemplary embodiment of any one of the apparatus above, at least one frame in the plurality of frames includes a compressed MAC header.

Another exemplary embodiment in accordance with this invention is an apparatus for cyclical bandwidth allocation. The apparatus includes means for allocating transmission resources for transmitting data packets, where the allocation of transmission resources include a cyclic bandwidth allocation of the transmission resources in a plurality of frames. Means for transmitting an indication of the allocation of transmission resources are also included. Allocating transmission resources includes allocating transmission resources for a first transmission of each HARQ process during the plurality of frames.

In a further exemplary embodiment of the apparatus above, the allocating means is a processing unit, and the transmitting means is a transmitter.

Another exemplary embodiment in accordance with this invention is an apparatus for cyclical bandwidth allocation. The apparatus includes means for receiving an indication of an allocation of transmission resources for data packets in a plurality of frames. Transceiver means for receiving and/or transmitting the plurality of frames using the allocation of transmission resources. The allocation of transmission resources includes a cyclic bandwidth allocation of the transmission resources in the plurality of frames. The allocation of transmission resources includes an allocation of transmission resources for a first transmission of each HARQ process during the plurality of frames.

In a further exemplary embodiment of the apparatus above, receiving means is a receiver, and the transceiver means is a transceiver.

A further exemplary embodiment in accordance with this invention is a method for cyclical allocation (also referred to as a periodic allocation). The method includes allocating transmission resources for transmitting data packets belonging to a session connection. The allocation of transmission resources includes a periodic allocation of the transmission resources which are applicable to a plurality of subsequent frames. The allocation of transmission resources includes an allocation of transmission resources for a first transmission of each HARQ process during the plurality of subsequent (or even consecutive) frames. Transmitting an indication of the allocation of transmission resources is also included in the method.

Another exemplary embodiment in accordance with this invention is a method for periodic allocation. The method includes receiving an indication of an allocation of transmission resources for data packets belonging to a session connection in a plurality of subsequent frames. Receiving and/or transmitting a plurality of data packets during the subsequent frames using the allocation of transmission resources are also included in the method. The allocation of transmission resources includes a periodic allocation of the transmission resources which are applicable to the plurality of subsequent frames. The allocation of transmission resources includes an allocation of transmission resources for a first transmission of each HARQ process during the plurality of subsequent frames.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of an IEEE 802.16-type system, it should be appreciated that the exemplary embodiments of this invention are not limited for use with only this one particular type of wireless communication system, and that they may be used to advantage in other wireless communication systems.

Still further, the various labels used, e.g., BS, MS, HARQ, etc., are not intended to be limiting in any respect, as these items may be identified by any suitable names or labels.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   allocating transmission resources for transmitting data packets, where the allocation of transmission resources comprise a periodic allocation of the transmission resources which are applicable to a plurality of frames; and
   transmitting an indication of the allocation of transmission resources,
   where the allocation of transmission resources comprises an allocation of transmission resources for a first transmission during the plurality of frames,
   where a hybrid automatic repeat request channel identifier is set as an initial value c; and the hybrid automatic repeat request channel identifier for each subsequent transmission is incremented by 1, except the hybrid automatic repeat request channel identifier is reset to c when a maximum hybrid automatic repeat request channel identifier, M+c, is reached, and
   where M is a maximum number of hybrid automatic repeat request channels.

2. The method of claim 1, where a medium access control header comprises the indication.

3. The method of claim 1, where the indication comprises at least one of an identification of a hybrid automatic repeat request channel, an acknowledge channel and hybrid automatic repeat request coding and modulation information.

4. The method of claim 1, where transmitting the indication occurs at a first frame of the plurality of frames.

5. The method of claim 1, where allocating transmission resources for transmitting data packets comprises allocating a physical layer burst in an orthogonal frequency division multiplex frame.

6. The method of claim 5, where the physical layer burst is automatically allocated the allocated transmission resources in subsequent frames until transmitting an indication of de allocating or a changing the allocation of the transmission resources.

7. The method of claim 1, where:
   when the transmission resources are uplink resources, allocating transmission resources for the hybrid automatic repeat request comprises allocating at least one acknowledge bit for a transmission of feedback during the plurality of frames and
   when the transmission resources are downlink resources, allocating transmission resources for the hybrid automatic repeat request comprises allocating an acknowledge feedback channel.

8. The method of claim 1, where the data packets comprise voice over internet protocol data packets.

9. The method of claim 1, where the indication comprises at least one of an initial hybrid automatic repeat request channel identifier, a total number of used hybrid automatic repeat request channels and an allocation period of the data packets.

10. A method comprising:
    allocating transmission resources for transmitting data packets, where the allocation of transmission resources comprise a periodic allocation of the transmission resources which are applicable to a plurality of frames; and
    transmitting an indication of the allocation of transmission resources,
    where the allocation of transmission resources comprises an allocation of transmission resources for a first transmission during the plurality of frames,
    where the periodic allocation comprises an allocation of:
    for a first frame in the plurality of frames, a hybrid automatic repeat request channel 0, and
    for subsequent frames in the plurality of frames, where the hybrid automatic repeat request channel of an immediately previous frame in the plurality of frames is channel n:
    when n+1 is less than a maximum number of allocated hybrid automatic repeat request channels, M, a hybrid automatic repeat request channel (n+1) and
    when n+1 is equal to M, the hybrid automatic repeat request channel 0.

11. A method comprising:
    receiving an indication of an allocation of transmission resources for data packets in a plurality of frames; and
    at least one of receiving and transmitting the data packets during the plurality of frames using the allocated transmission resources,
    where the allocation of transmission resources comprise a periodic allocation of the transmission resources which are applicable to the plurality of frames, and
    where the allocation of transmission resources comprises an allocation of transmission resources for a first transmission during the plurality of frames,
    where a hybrid automatic repeat request channel identifier is set as an initial value, c; and the hybrid automatic repeat request channel identifier for each subsequent transmission is incremented by 1, except the hybrid automatic repeat request channel identifier is reset to c when a maximum hybrid automatic repeat request channel identifier, M+c, is reached, and
    where M is a maximum number of hybrid automatic repeat request channels.

12. The method of claim 11, where a medium access control header comprises the indication.

13. The method of claim 11, where the indication comprises at least one of an identification of a hybrid automatic repeat request channel, an acknowledge channel and hybrid automatic repeat request coding and modulation information.

14. The method of claim 11, where receiving the indication occurs at a first frame of the plurality of frames.

15. The method of claim 11, where the allocation of transmission resources comprise an allocation for a physical layer burst in an orthogonal frequency division multiplex frame.

16. The method of claim 15, where a subsequent data packet is received in the allocated transmission resources in subsequent frames until receiving an indication of a de allocation or a changing of the allocation of the transmission resources.

17. The method of claim 11, where:
when the transmission resources are uplink resources, the allocation of transmission resources for a hybrid automatic repeat request comprises an allocation of at least one acknowledge bit for a transmission of feedback during the plurality of frames and
when the transmission resources are downlink resources, the allocation of transmission resources for the hybrid automatic repeat request comprises an allocation of an acknowledge feedback channel.

18. The method of claim 11, where the data packets comprise voice over internet protocol data packets.

19. A computer readable memory tangibly embodying a computer program comprising instructions comprising:
allocating transmission resources for transmitting data packets, where the allocation of transmission resources comprise a periodic allocation of the transmission resources which are applicable to a plurality of frames; and
transmitting an indication of the allocation of transmission resources,
where the allocation of transmission resources comprises an allocation of transmission resources for a first transmission during the plurality of frames,
where a hybrid automatic repeat request channel for a first transmission is set as an initial hybrid automatic repeat request channel value, c; and the hybrid automatic repeat request channel for each subsequent transmission is incremented by 1, except the hybrid automatic repeat request channel is reset to c when a maximum hybrid automatic repeat request channel, M+c, is reached, and
where M is a maximum number of allocated asynchronous channels.

20. The computer readable memory of claim 19, where the indication comprises at least one of an initial hybrid automatic repeat request channel identifier, a total number of used hybrid automatic repeat request channels and an allocation period of the data packets.

21. A computer readable memory tangibly embodying a computer program comprising instructions comprising:
receiving an indication of an allocation of transmission resources for data packets in a plurality of frames; and
at least one of receiving and transmitting the data packets during the plurality of frames using the allocation of transmission resources,
where the allocation of transmission resources comprise a periodic allocation of the transmission resources that is applicable to the plurality of frames, and
where the allocation of transmission resources comprises an allocation of transmission resources for a first transmission during the plurality of frames,
where a hybrid automatic repeat request channel for a frame for a first transmission is set as an initial hybrid automatic repeat request channel value, c; and the hybrid automatic repeat request channel for each subsequent transmission is incremented by 1, except the hybrid automatic repeat request channel is reset to c when a maximum hybrid automatic repeat request channel, M+c, is reached, and
where M is a maximum number of allocated asynchronous channels.

22. The computer readable memory of claim 21, where the indication comprises at least one of an initial hybrid automatic repeat request channel identifier, a total number of used hybrid automatic repeat request channels and an allocation period of the data packets.

23. An apparatus comprising:
a processing unit configured to allocate transmission resources for transmitting data packets, where the allocation of transmission resources comprise a periodic allocation of the transmission resources which are applicable to a plurality of frames; and
a transmitter configured to transmit an indication of the allocation of transmission resources,
where the allocation of transmission resources comprises an allocation of transmission resources for a first transmission during the plurality of frames,
where a hybrid automatic repeat request channel identifier is set as an initial value, c; and the hybrid automatic repeat request channel identifier for each subsequent transmission is incremented by 1, except the hybrid automatic repeat request channel identifier is reset to c when a maximum hybrid automatic repeat request channel identifier, M+c, is reached, and
where M is a maximum number of hybrid automatic repeat request channels.

24. The apparatus of claim 23, where the indication comprises at least one of an initial hybrid automatic repeat request channel identifier, a total number of used hybrid automatic repeat request channels and an allocation period of the data packets.

25. The apparatus of claim 23, where transmitting the indication occurs at a first frame of the plurality of frames.

26. The apparatus of claim 23, where allocating transmission resources for transmitting data packets comprises allocating a physical layer burst in an orthogonal frequency division multiplex frame.

27. An apparatus comprising:
a transceiver configured to receive an indication of an allocation of transmission resources for data packets in a plurality of frames; and
to one of receive and transmit the plurality of frames using the allocation of transmission resources,
where the allocation of transmission resources comprise a periodic allocation of the transmission resources that is applicable to the plurality of frames, and
where the allocation of transmission resources comprises an allocation of transmission resources for a first transmission during the plurality of frames,
where a hybrid automatic repeat request channel identifier is set as an initial value, c; and the hybrid automatic repeat request channel identifier for each subsequent transmission is incremented by 1, except the hybrid automatic repeat request channel identifier is reset to c when a maximum hybrid automatic repeat request channel identifier, M+c, is reached, and
where M is a maximum number of hybrid automatic repeat request channels.

28. The apparatus of claim 27, where the indication comprises at least one of an initial hybrid automatic repeat request channel identifier, a total number of used hybrid automatic repeat request channels and an allocation period of the data packets.

29. The apparatus of claim 27, where receiving the indication occurs at a first frame of the plurality of frames.

30. An apparatus comprising:
 means for allocating transmission resources for transmitting data packets, where the allocation of transmission resources comprise a periodic allocation of the transmission resources that is applicable to a plurality of frames; and
 means for transmitting an indication of the allocation of transmission resources,
 where the allocation of transmission resources comprises an allocation of transmission resources for a first transmission during the plurality of frames,
 where the periodic allocation comprises an allocation of:
 for a first frame in the plurality of frames, a hybrid automatic repeat request channel 0, and
 for subsequent frames in the plurality of frames, where the hybrid automatic repeat request channel of an immediately previous frame in the plurality of frames is channel n:
 when n+1 is less than a maximum number of allocated hybrid automatic repeat request channels, M, the hybrid automatic repeat request channel (n+1) and
 when n+1 is equal to M, the hybrid automatic repeat request channel 0.

31. The apparatus of claim 30, where the allocating means is a processing unit, and the transmitting means is a transmitter.

32. A apparatus comprising:
 means for receiving an indication of an allocation of transmission resources for data packets in a plurality of frames; and
 transceiver means for at least one of receiving and transmitting the plurality of frames using the allocation of transmission resources,
 where the allocation of transmission resources comprise a periodic allocation of the transmission resources that is applicable to the plurality of frames, and
 where the allocation of transmission resources comprises an allocation of transmission resources for a first transmission during the plurality of frames,
 where the periodic allocation comprises an allocation of:
 for a first frame in the plurality of frames, a hybrid automatic repeat request channel 0, and
 for subsequent frames in the plurality of frames, where the hybrid automatic repeat request channel of an immediately previous frame in the plurality of frames is channel n:
 when n+1 is less than a maximum number of allocated hybrid automatic repeat request channels, M, the hybrid automatic repeat request channel (n+1) and
 when n+1 is equal to M, the hybrid automatic repeat request channel 0.

33. The apparatus of claim 32, where the receiving means is a receiver, and the transceiver means is a transceiver.

\* \* \* \* \*